Figure 1:
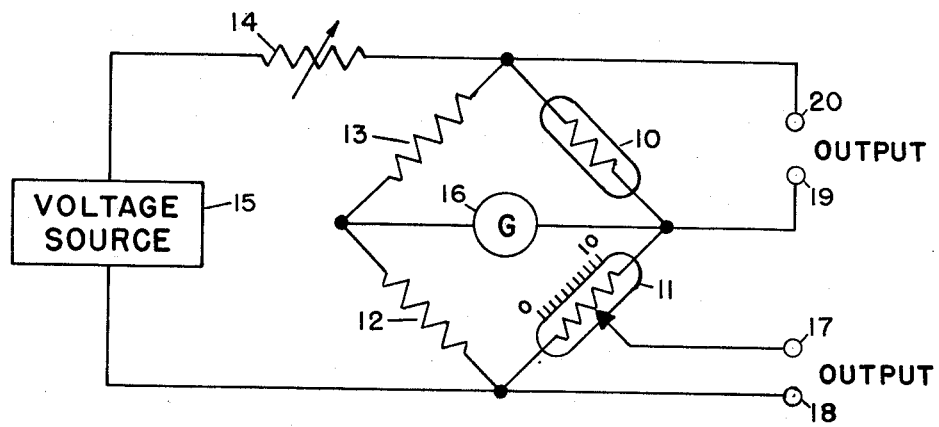

Aug. 14, 1956   J. ROSENBAUM   2,759,150
CIRCUIT AND METHOD FOR PRODUCING STANDARD VOLTAGES
Filed June 4, 1952

*INVENTOR.*
JACOB ROSENBAUM
BY
*Samuel J. Snyder*
ATTORNEY

United States Patent Office 2,759,150
Patented Aug. 14, 1956

2,759,150

CIRCUIT AND METHOD FOR PRODUCING STANDARD VOLTAGES

Jacob Rosenbaum, Spring Valley, N. Y.

Application June 4, 1952, Serial No. 291,617

11 Claims. (Cl. 324—98)

This invention relates to a direct current or an alternating current standard voltage supply circuit and applications of said circuit.

Many electrical measurements require the use of a standard voltage source for calibrating or comparison purposes. The "Weston" standard voltage cell is generally used at present for electrical measurements. It is a small battery supplying 1.0184 volts. While its accuracy is satisfactory, and indeed much greater than is necessary for most measurements, the standard voltage cell has a number of very serious limitations. First, its accuracy is permanently impaired if more than an extremely small current is drawn from the cell. Secondly, it provides only a D. C. voltage and therefore does not lend itself readily to A. C. measurements. The standard voltage cell is difficult to manufacture since the greatest possible purity of the materials of the cell is necessary. Further, when a standard voltage is needed at very low temperatures, the standard cell becomes unusuable. Another limitation of the standard cell is that its voltage is fixed and of a rather small, non-integral value.

It is an important object of my invention to provide a standard voltage source which avoids the above described disadvantages. A further very important object of my invention is to provide a standard A. C. voltage. Another object of my invention is to provide a continuous range of A. C. or D. C. voltages, instead of the single D. C. voltage of the standard cell.

A further object of my invention is to provide a calibration circuit similar to a Drysdale potentiometer which does not require a standard voltage cell and which can be calibrated for alternating current immediately, without first calibrating on direct current.

These and other objects of my invention are accomplished by providing a circuit which attains a balanced condition when a predetermined voltage is developed in one branch of the circuit. According to one embodiment of my invention a bridge circuit such as a Wheatstone resistance bridge has a current-variable resistance in at least one arm. A voltage is impressed on one diagonal of the bridge and adjusted to a value such that the bridge becomes balanced, as shown by a null indicating device connected across the other diagonal of the bridge. The bridge becomes balanced when the impressed voltage is adjusted to a value which causes the current through the current-variable resistor to increase its resistance to the value which balances the bridge. Since the bridge will become balanced only for a given voltage impressed thereon, and the ratios of the resistances of the arms of the bridge are known, the voltage across each arm of the bridge at balance is known. One of the arms of the bridge maybe a calibrated potentiometer, in which case a continuous range of calibrated or known voltages is obtained. By providing the standard, or known, voltage circuit of this invention in place of the calibrating circuits commonly used in a Drysdale or similar potentiometer the latter can be calibrated for A. C. directly, saving the usual equipment and operating time required to calibrate with D. C. voltages, then switch to A. C. voltages and adjust the A. C. power supply to duplicate on a dynamometer the D. C. readings.

Figure 2:
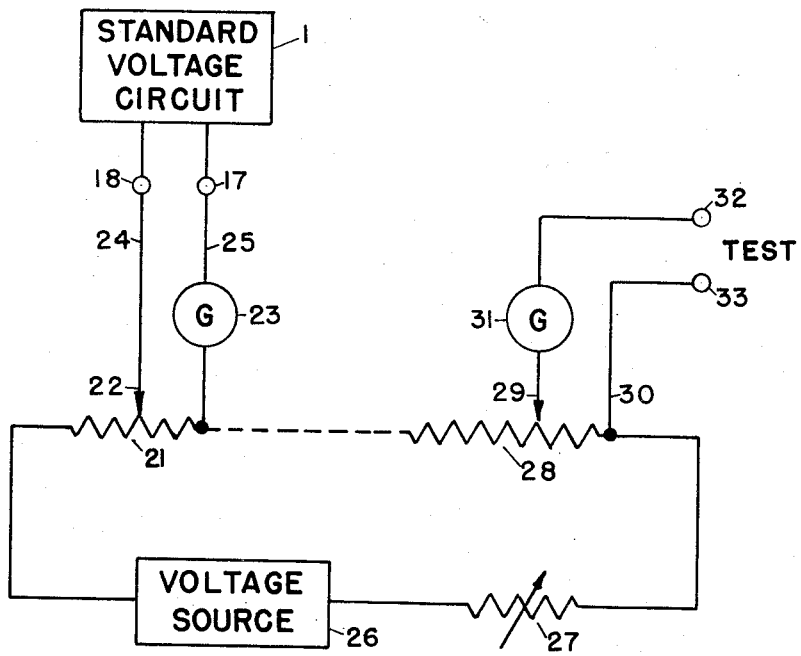

These and other advantages will become apparent from the following description of my invention and from the illustrative example thereof shown in the drawing, wherein:

Fig. 1 shows one embodiment of a circut for producing standard voltages according to my invention, and Fig. 2 shows a simplified circuit diagram of a measuring potentiometer arrangement embodying the standard voltage circuit of Fig.1.

Referring to the drawing there is shown in Fig. 1 a Wheatstone bridge consisting of impedances or resistors 10, 11, 12, and 13, at least one of which is current-variable. The current-variable resistor, 10, may consist of any number of individual resistor units or elements connected in series or in any other known manner, at least one of the units having a variable resistance for varying currents. Many types of current-variable resistors which can be utilized for this purpose are known. The current-variable resistor 10 preferably has a rapid variation, either increasing or decreasing, of resistance with increasing current. Although for the sake of simplicity the Wheatstone bridge will be described with particular reference to one current-variable resistance arm, it will be understood by those skilled in the art that any number of the bridge arms may be variable with current, so long as the rate of resistance variation of at least one of the arms differs from that of its two adjacent arms. The resistance of the arm 10 may increase while that of arm 11 or 13 decreases with increasing current.

The current-variable resistor 10 may, for example, be a Wollaston wire enclosed in a glass envelope. Other types of current-variable resistances known as thermistors and varistors may also be used.

Across one diagonal of the bridge is connected a variable voltage supply circuit. Any suitable voltage source 15 having sufficient stability and supplying either A. C. or D. C. voltage, as desired, may be connected by a variable resistor 14 across the bridge. Any other means of providing stable adjustable voltages may be used, the circuit 14, 15 of Fig. 1 being merely illustrative.

Across the other diagonal of the bridge is connected a null indicator 16. While many types of Wheatstone bridge null indicators are known, I have for the sake of simplicity shown the indicator 16 as being a galvanometer. The arm 11 of the bridge is preferably a potentiometer connected to an output circuit having terminals 17 and 18. If desired another voltage output circuit including terminals 19 and 20 may be connected across another arm of the bridge, such as variable resistance arm 10.

The operation of the circuit of Fig. 1 is as follows. The voltage source 15, which in practice is provided with the usual switches is turned on in order to apply an A. C. or D. C. voltage, as desired, to the bridge. The galvanometer 16 will indicate the unbalance of the bridge. The applied voltage is then varied, as by adjusting resistor 14, until galvanometer 16 shows by a null reading that the bridge is balanced. The bridge becomes balanced when the current through resistor 10 brings its resistance to the proper value. This resistance value will be attained for a given current through resistor 10. At this resistance value and this current value a predetermined voltage will exist across resistor 10. Also, a predetermined voltage will then exist across each arm of the bridge. Consequently, by providing an accurately calibrated potentiometer at 11 an entire range of known voltages may be obtained. When A. C. voltages are applied to the bridge it is possible to obtain voltage of opposite phase at the two pairs of terminals 17, 18 and 19, 20.

Fig. 2 shows a potentiometer circuit which may be compared to a Drysdale or similar potentiometer frequently used for providing known test voltages for calibrating meters, or for comparison measurements of unknown voltages. The circuit consists of a resistance, shown as having portions 21 and 28, connected in series with a variable voltage supply 26, 27. The resistance 21, 28 may consist of one or more potentiometers or a series-tapped fixed resistor. The source 26 may be A. C. or D. C. and variable resistor 27 controls the amount of current in the circuit.

Across a portion of resistor 21 is connected the standard voltage circuit 1, shown in Fig. 1. The terminals 17 and 18 of the circuit of Fig. 1 are connected by leads 24 and 25 through a galvanometer or other indicator 23 to resistor 21. One connection 22 to resistor 21 may be variable. Across another variable resistor portion 28 output leads 29, 30 are connected through a galvanometer 31 to test terminals 32, 33.

In operation the circuit of Fig. 2 is calibrated by connecting the standard voltage source to a known portion of the resistance 21, 28 and then adjusting resistor 27 until galvanometer 23 gives a null reading. The voltage across resistance 21 is then equal to the known standard voltage at terminals 17, 18. The voltage across any other known portion 28 of the resistance of the circuit is then known. This known voltage, appearing at the test terminals 32, 33, may be used for various testing, measuring, or calibrating purposes. An unknown voltage applied to terminals 32, 33 may be measured by adjusting the tap 29 until galvanometer 31 indicates a null. The unknown voltage is then equal to the known voltage across the portion of resistance 28 between conductors 29 and 30. It is evident that the circuit of Fig. 2 can operate on either A. C. or D. C. equally well. Although the galvanometers 16, 23, and, 31 are shown as separate instruments it is apparent that a single galvanometer may be switched into all three positions. This is possible since at all three positions the galvanometer is required to serve merely as a null indicator. Further, any type of null indicator may be used, a galvanometer being only exemplary.

Many variations and modifications of the circuits I have shown and described to exemplify the principles of my invention will be readily apparent to those skilled in the art. It will be evident, for example, that the bridge may be provided with suitable temperature compensating means to correct for errors due to variations of ambient temperature, although the need for such compensation can be substantially obviated by causing the normal operating temperature of resistor 10 to be very high, and causing the temperature coefficients of the other arms of the bridge to be negligible. The scope of my invention is therefore as defined by the following claims.

What is claimed is:

1. A standard voltage supply circuit comprising a Wheatstone bridge including an element in one arm thereof, said element having an impedance which varies with the current passing therethrough, the impedances of the other arms of the bridge being such that the bridge is unbalanced when no current flows through said element, means for impressing a voltage across one pair of diagonal terminals of said bridge, means connected across the other pair of diagonal terminals for indicating balance of said bridge, output conductors connected across at least a portion of an arm of the bridge lying between said first mentioned diagonal terminals, and means for adjusting the impressed voltage to the value at which the element attains the impedance required to balance the bridge and produce a predetermined voltage across said output conductors.

2. A circuit according to claim 1 including a resistance, means for impressing a voltage of variable magnitude across said resistance, means connecting a portion of said resistance between the output conductors, means for indicating the current in one of said output conductors, and a second pair of conductors connected across a different portion of said resistance.

3. A circuit according to claim 2 wherein said source of voltage is an alternating voltage source and said means for impressing a voltage across said resistance impresses an alternating voltage thereon.

4. A circuit according to claim 2 including a current indicating device in series with one of the second pair of conductors and means for varying the portion of the resistance connected between the second pair of conductors.

5. A circuit according to claim 1, wherein the last mentioned arm of the bridge includes a calibrated potentiometer, one of the output conductors being connected to the movable contact of the potentiometer.

6. A circuit according to claim 1, wherein said means for impressing a voltage includes an alternating current source.

7. A circuit according to claim 1, wherein the means for impressing a voltage includes a direct current source.

8. A circuit according to claim 1, wherein the output conductors are connected to an arm of the bridge having a negative resistance-temperature co-efficient and said element having a positive resistance-temperature coefficient.

9. A standard voltage supply circuit comprising a Wheatstone resistance bridge including a resistor in one arm thereof having a resistance which varies with the current therethrough, only one source of voltage connected to said bridge, means for manually adjusting the magnitude of said voltage to the value at which said resistor attains the resistance required to balance the bridge, means for indicating when said bridge is balanced, and means for deriving a predetermined finite appreciable output voltage from at least a portion of one arm only of said bridge in its balanced condition.

10. A circuit according to claim 9, wherein the other three arms of the bridge consist of resistors the resistances of which are substantially independent of the current in said resistors.

11. A circuit according to claim 1 wherein said resistor comprises a fine wire enclosed in a glass envelope, the wire being so fine that it reaches a high temperature when the bridge is balanced.

References Cited in the file of this patent

UNITED STATES PATENTS

| 2,175,890 | Glowatzki | Oct. 10, 1939 |
| 2,415,823 | Houghton | Feb. 18, 1947 |
| 2,425,641 | Remde | Aug. 12, 1947 |
| 2,449,072 | Houghton | Sept. 14, 1948 |
| 2,478,742 | Buonincontri | Aug. 9, 1949 |
| 2,510,347 | Perkins | June 6, 1950 |
| 2,525,901 | Hansen et al. | Oct. 17, 1950 |
| 2,528,446 | McConnell | Oct. 31, 1950 |
| 2,577,543 | Saad | Dec. 4, 1951 |

FOREIGN PATENTS

| 340,524 | Germany | Sept. 13, 1921 |